Figure 1:
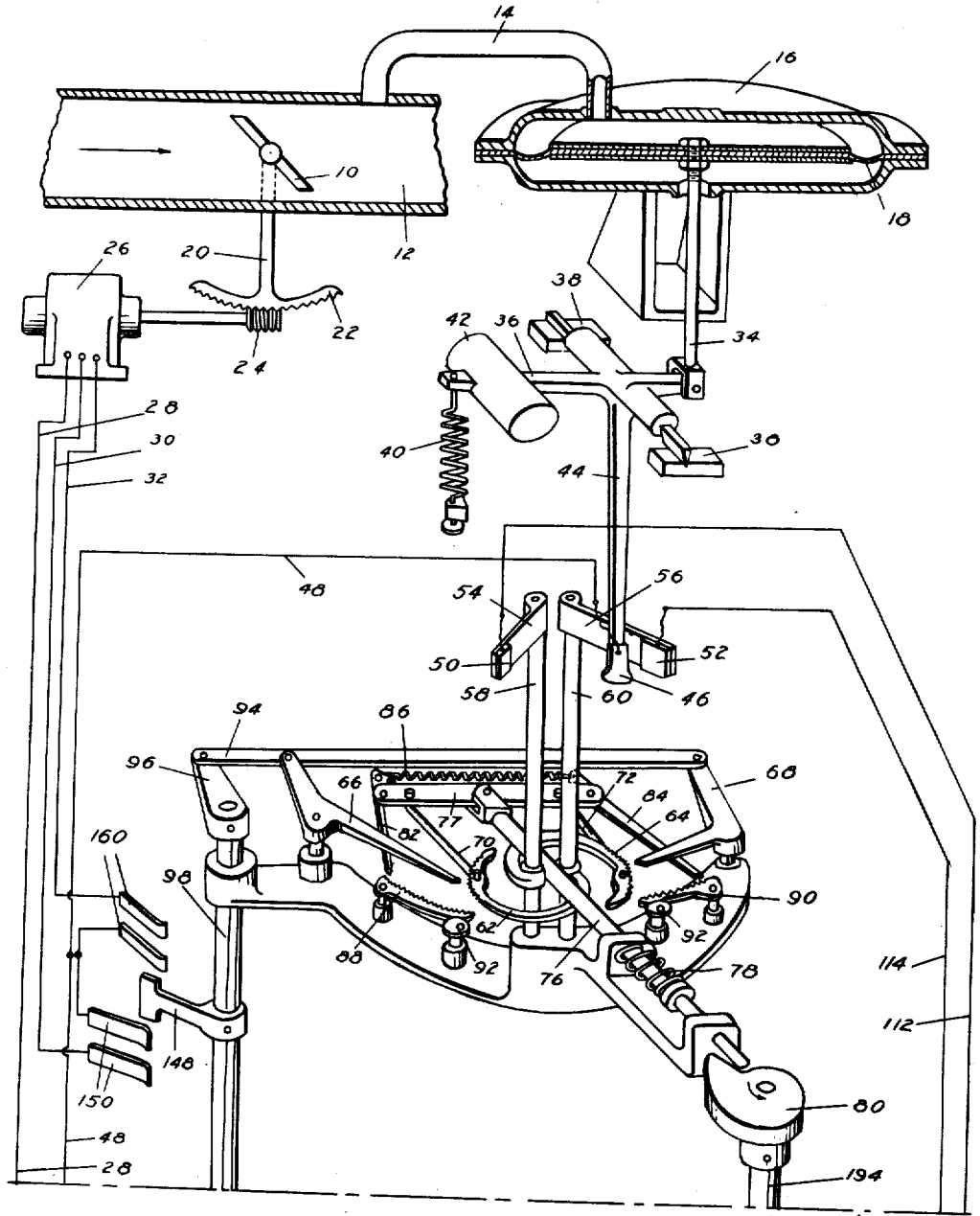

July 4, 1939.　　C. H. SMOOT　　2,164,548
REGULATOR
Filed Jan. 17, 1936　　2 Sheets-Sheet 1

Fig. I

Inventor
CHARLES H. SMOOT, DECEASED
BY KATHERINE E. SMOOT
EXECUTRIX
BY McConkey + Booth.
ATTORNEYS.

July 4, 1939.　　　C. H. SMOOT　　　2,164,548
REGULATOR
Filed Jan. 17, 1936　　　2 Sheets-Sheet 2

Inventor
CHARLES H. SMOOT, DECEASED
BY KATHERINE E. SMOOT
EXECUTRIX
BY
McConley & Booth
ATTORNEYS.

Patented July 4, 1939

2,164,548

UNITED STATES PATENT OFFICE 2,164,548

REGULATOR

Charles H. Smoot, deceased, late of Maplewood, N. J., by Katherine E. Smoot, executrix, Maplewood, N. J., assignor to said Katherine E. Smoot Application January 17, 1936, Serial No. 59,574

14 Claims. (Cl. 172—239)

This invention relates to regulators, and is illustrated as embodied in an electrical regulator capable of use in controlling fluid flows, pressures, and the like. An object of the invention is to provide a sensitive power-operated regulator which operates accurately and effectively, and which is suitable for use with remote controls.

In one desirable arrangement, the pressure or other condition which is to be controlled shifts a part, for example a swinging arm or lever, arranged between two feeler members which are periodically shifted toward and from said part. These members are preferably actuated by means such as an equalizer mechanism embodying, in combination with a device for automatically locking or holding whichever feeler member engages said part, means for causing the other feeler member to continue its motion past its normal end point so that the feeler members finally become centered about the new or shifted portion of the control part.

The feeler members now move jointly toward and from the shifted position of the control part. However, as the pressure or other condition being controlled gradually returns to its normal value due to the correction made, as described below, in accordance with the action of the feeler members, according to an important feature of the invention the center about which the feeler members operate is gradually shifted back to its initial or normal position. Thus the regulator does not interfere further if the condition is corrected to the desired value, and with no more than the permitted time lag, but remains ready at any time to make further corrections if the correction is not made as intended.

The above-described mechanism is of a cyclic character, being operated periodically and automatically, and it is preferred to arrange the regulator so that the correcting means (shown as a reversible electric motor operating a damper or valve) operates in accordance with a time element determined by the fact that one or the other of the feeler members engages the control part, when it shifts from normal, at a time in the cycle which depends on how far the control part has departed from normal, whereas the end of the cycle (and therefore of the time element) of course always comes at the same time.

Since this gives, as the control factor, a time element, this makes the regulator suitable for very effective use by electrical means, without added complication if remote control is desired, since the time during which a current flows can be utilized to make measured corrections without interference from variations in voltage or resistance or the like. Accordingly several very important features of the invention relate to arranging the regulator for such novel electrical operation.

One of these features relates to the closing and opening of a double control circuit for a reversible control motor, by novel circuit closing and circuit opening means. Another such feature relates to the periodic cyclic operation of the regulator by novel means which may easily be set to give periodic operation through a definite single cycle at regular time intervals (short or long, as desired).

Figure 2:
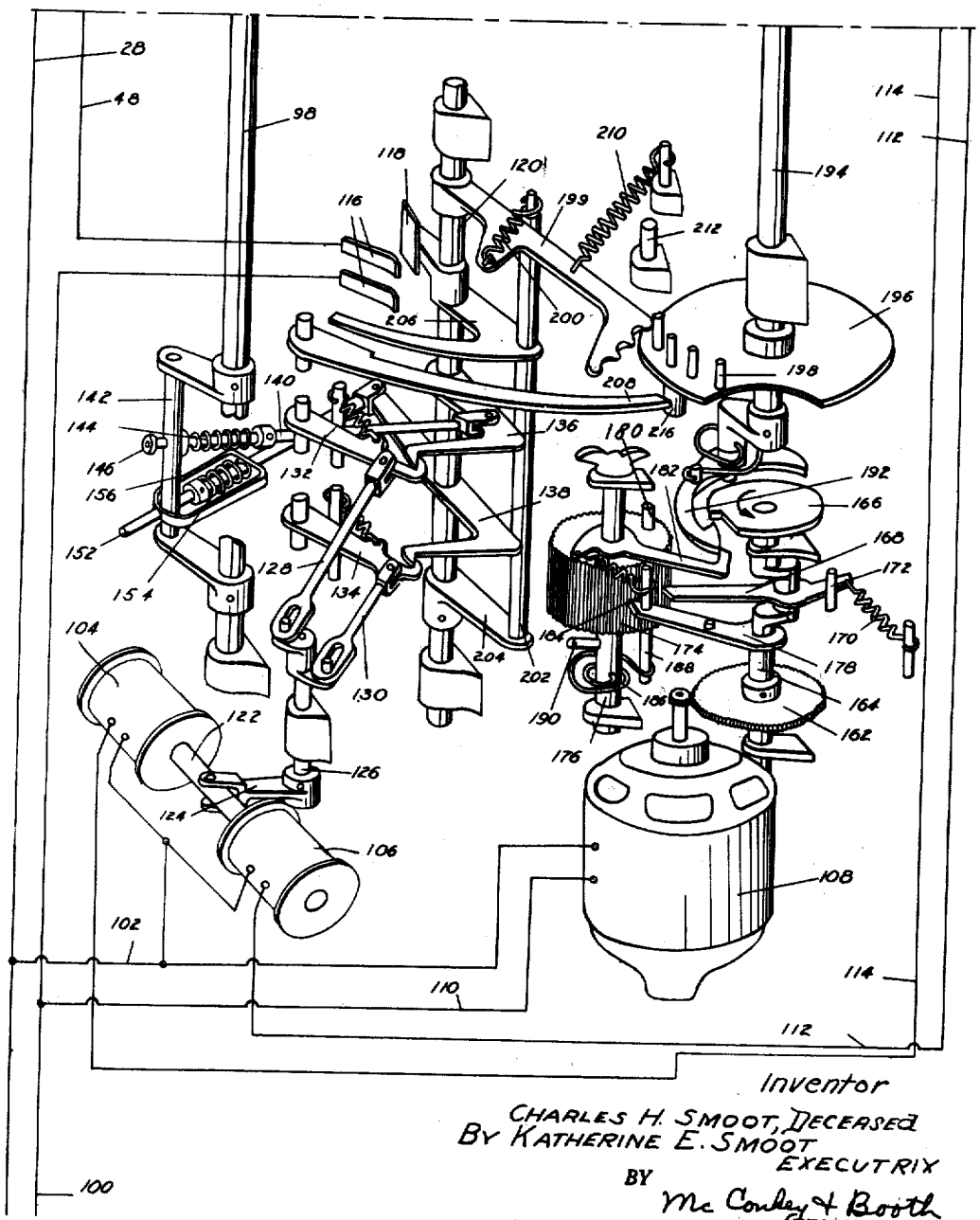

The above and other objects and features of the invention, including various novel arrangements and desirable particular constructions, will be apparent from the following description of the illustrative embodiment shown in the accompanying drawings, in which:

Fig. 1 is a diagrammatic perspective view of the upper part of the operating parts only of the novel regulator; and Fig. 2 is a diagrammatic perspective view of the lower part of the regulator.

By way of illustration, the regulator is shown as arranged to control a valve or damper 10 in a conduit 12, to maintain a uniform pressure in the conduit at its point of connection with a passage 14 to a diaphragm casing 16 above a diaphragm 18 therein, the space below the diaphragm being subject to a different pressure, which may be that of the atmosphere. It will be appreciated, however, that this use is purely illustrative, and that the regulator may be utilized for any of the many uses of automatic regulators, especially those involving remote control.

In this illustrative arrangement, the valve or damper 10 is shown as operated by an arm 20 having a rack or segmental worm gear 22 meshing with and driven by a worm 24 on the armature shaft of a reversible electric motor 26 provided with the usual three circuit wires 28, 30, and 32 which are here arranged in a novel double circuit described below.

The diaphragm 18 is shown connected by means such as a link 34 with a pivoted balance beam 36, shown mounted by knife-edges on bearings 38. The balance beam is acted on, and balanced against the downward thrust of diaphragm 18, by means such as a tensioned coil spring 40 and/or an adjustable weight 42.

Rigid with the balance lever 36 is a downwardly extending arm 44 carrying a control part such as a contact 46 having connected thereto a lead wire 48 forming part of a control circuit described below. It will be noted that control part 46 is shifted to one side or the other of its normal central position, in accordance with fluctuations in the pressure in the conduit 12.

The part 46 is arranged between contacts or the like 50 and 52 carried by feeler members such as arms 54 and 56 mounted on the upper ends of parallel shafts 58 and 60. The lower ends of the shafts 58 and 60 carry locking means such as spiral racks 62 and 64 adapted for alternative engagement by pivoted locking pawls 66 and 68.

As a matter of convenience, the racks 62 and 64 are also utilized as crank arms for connecting to the shafts 58 and 60 respectively two links 70 and 72 pivoted at their forward ends to opposite ends of an equalizer bar 74. The equalizer bar is connected by a friction pivot to the end of a plunger or the like 76 operated periodically against the resistance of a spring 78 by means such as a cam 80 shaped to move the plunger 76 gradually in one direction and then to allow the spring to move it suddenly in the other direction.

The friction connection between the equalizer bar 74 and the plunger 76 holds the bar in any angular position it may assume, until acted on by some external force. This external force, in the illustrated regulator, is supplied by two thrust pawls 82 and 84, interconnected to move in unison and held against suitable stops on bar 74 by a tensioned spring 86 so that only one is effective at a time, and which are engageable selectively when the bar 74 is at one side or the other of its centered position by one or the other of two curved or cam-shaped rack bars 88 and 90. These bars are pivoted at their outer ends, and their inner ends engage adjustable eccentric stops 92 or the like, which can be shifted to change the slope of the rack bars.

The operation of this part of the mechanism is as follows: Assume that part 46 is at one side of its normal or centered position, and that the equalizer bar has (as hereinafter described) been shifted to a corresponding new angular position on the plunger 76. Now, as the plunger 76 reciprocates, near the end of each stroke one or the other of the pawls 82 or 84 (according to which side of center the bar 74 then is) engages its rack and stops its end of the bar 74, whereupon during the remainder of the stroke the bar 74 is turned slightly toward its normal centered position. During this turning movement the spring 86 permits the necessary slight angular movement of the pawl 82 or 84.

On the next stroke the pawl will engage its rack slightly further from the adjustment 92, until when the bar 74 eventually becomes centered, perpendicular to plunger 76, the two pawls are in the illustrated positions, symmetrically opposite the outer or pivoted ends of the rack bars 88 and 90, and further reciprocation of plunger 76 has no further effect on the angular position of bar 74. Thus the bar 74, when once displaced by a shifting of part 46 as hereafter described, is gradually "walked" back to its centered position by the successive reciprocation of the plunger 76, the rate of "walking" being determined by the adjustment of the eccentrics 92.

Since the shafts 58 and 60 are linked to and operated respectively by the opposite ends of the bar 74, the above-described method of operation means that, when part 46 is shifted to one side of center and bar 74 is correspondingly shifted, the arms 54 and 56 swing toward and from the shifted position of parts 46, and as the bar 74 is "walked" back to its centered position the point toward and from which the arms 54 and 56 swing is gradually shifted back toward the normal centered position of part 46, at approximately the same rate (determined by properly circulating the setting of stops 92) as the actual return of the part 46 by the increase or diminution of pressure in conduit 12 due to the new setting of valve 10, as it builds up in the diaphragm casing 16.

The locking pawls 66 and 68 are interconnected, and are operated, by a bar 94 connected for lengthwise movement by an arm 96 on the upper end of a vertical shaft 98.

The wire 28 may be one of the line wires of a source of current, the other line wire of which is shown at 100. The line wire 28 is connected by a lead 102 to the adjacent ends of two oppositely arranged alined solenoids 104 and 106, and also to a motor 108 which is also connected by a lead 110 (through a suitable switch, not shown) to the line wire 100. The motor 108 therefore runs continuously while the regulator is in use. The other side of the solenoid 106 is connected by a lead 112 to the contact 50, and the other side of the solenoid 104 is connected by a lead 114 to the contact 52. Thus the engagement of one or the other of the contacts 50 or 52 closes a circuit from the line wire 28 through one or the other of the solenoids 106 or 104, through one or the other of leads 112 or 114, through contact 50 or 52, to contact 46 and lead 48.

The lead 48 extends to one of a pair of contacts 116, the other of which is connected to the line wire 100. These contacts, at the beginning of the cycle of operations, are bridged by a contact 118 carried by an arm on a rockshaft 120. Therefore, the above-described closing of the circuit energizes either solenoid 106 or 104 to shift lengthwise in one direction or the other a core 122 connected by an arm 124 to operate a short vertical rockshaft 126 having at its upper end lost-motion one-way pin-and-slot connection with two thrust links 128 and 130, one of which is actuated by energization of the solenoid 106 and the other by the solenoid 104.

Links 128 and 130 are connected respectively to latches 132 and 134, which normally hold arms 136 and 138 carried by the vertical shaft 120.

Arm 136 is connected on one side of the shaft 120 by a link 140 to a crank 142 forming in effect an operating portion of the vertical shaft 98. A spring 144, sleeved on link 140 between a stop on said link at one end and said crank 142 at the other end, is normally held in compression by the latch 134. A head 146 at the end of the link 140 is spaced from the crank 142, as shown, until the release of the latch 134 enables the spring 144 to shift the crank 142 against the head 146.

Such shifting of the crank 142 rocks shaft 98 in a direction to cause an arm 148 to bridge contacts 150, one of which is connected to the lead 48 and the other to the lead 30. This closes a circuit through motor 26, through leads 28 and 30, causing operation of the motor in a corresponding direction, and correspondingly operating to open gradually the valve or damper to compensate for the reduced pressure above diaphragm 18 which caused the energization of the solenoid 104.

The arm 138 is connected, on the other side of the shaft 120, with the crank 142 by a link 152 having sleeved thereon a spring 154 normally held compressed by latch 132 between a stop on the link and a yoke 156 which engages the crank 142. Thus the tripping of the latch 132 causes spring 154 to rock the arm 148, in the opposite direction from that caused by the spring 144, to bridge a pair of contacts 160, one of which is connected to the lead 48 and the other to the lead 32. This operates the motor 26 in a reverse direction, to gradually close the valve 10 to compensate for the increase in pressure above the diaphragm which caused the energization of the solenoid 102 which released the latch 132.

The motor 108 operates continuously driving through suitable gearing 162 a vertical shaft 164 which rotates a notched clutch plate 166, and which has a cranked portion which constantly reciprocates a pawl 168. The pawl 168 is held by a spring 170 against a stop 172, so that rotation of the shaft 164 causes the pawl to engage on its forward stroke and disengage on its rearward stroke a ratchet disk 174 loosely sleeved on a vertical shaft 176.

The ratchet disk 174 is held, as it is advanced step by step by the pawl 168, by a spring-held holding pawl 178, shown as sleeved on the shaft 164. When the disk reaches a predetermined position, a pin 180 carried thereby engages and releases a latch 182, which in turn engages a pin 184 carried by the holding pawl 178.

As soon thereafter as the disengagement of pawl 168 from the ratchet disk 174 permits, the ratchet disk 174 is returned by a tensioned spiral spring 186 to an initial position determined by engagement of a pin 188 on the disk with a stop pin 190 on the shaft 176. The position of the stop pin 190 can be adjusted, to determine the time interval of the cycle of operation of this ratchet mechanism, by turning the shaft 176 in its bearings and suitably clamping it in adjusted position.

The latch 182 normally holds out of engagement with the notch in the driving clutch disk 166 a catch 192 carried eccentrically by a vertical shaft 194 which carries the cam 80. The catch 192 forms the driven clutch member of a one-revolution clutch, and as soon as released by the latch 182 it is yieldingly urged by its spring into engagement with the driving disk 166, where it engages the notch in the disk the next time it comes around. After one revolution of the shaft 194, the latch 182 again engages the catch 192 and cams it out of engagement with the disk 166.

As soon as the catch 192 is released, it moves into engagement with the clutch disc 166 in front of the latch 182. Therefore, when the latch 182 tends to move back to its original position as the wheel 174 commences to move, its end will engage the outer edge of the catch 192 and it will be held in its displaced position to hold the pawl 178 out of engagement with the wheel 174, thereby permitting the wheel 174 to turn freely. As the disc 166 and catch 192 rotate, the latch 182 will drop off of the rear end of the catch 192 and will move into a position to engage the front end of the catch, at the same time releasing the pawl 178 and permitting it to move into engagement with the wheel 174.

The shaft 194 also carries a disk 196 carrying pins 198 arranged, at one point in the revolution of the shaft, drivably to mesh like gear teeth with notches in the end of a lever 199 sleeved at its opposite end on the shaft 120. This shifts the lever in a direction to tension a spring 200 connected thereto, applying yielding pressure tending to turn a yoke bar 202 acted on by the spring 200, and which is rigidly connected to the shaft 120 by a lower arm 204 and an upper arm 206 which is extended to form a catch normally seated in a notch in a pivoted latch 208.

When the spring 200 is fully tensioned, a pin 216 on the disk 196 engages and releases the latch 208, whereupon the spring 200 acts on the yoke bar 202 to rock the shaft 120 to reengage whichever one of the latches 132 or 134 was previously disengaged, and to swing the arm 118 in a direction to break the current at 116 slightly before it is broken at 150 or 160 by the reengagement of latch 132 or 134.

Immediately thereafter, the last one of the pins 198 releases the lever 199, which is immediately swung by a spring 210 to its initial position against a stop 212, thereby again swinging the arm 118 to bridge and close the contacts 116, and reengaging the catch 206 with the latch 208. The latch 208 has a suitable spring (not shown) urging it into such reengagement with the catch 206. This brings all the parts to their initial positions, ready for the next cycle.

In operation, a change in the pressure in conduit 12 (or a corresponding change in any other condition being controlled) causes a corresponding change in the position of the control part 46. The next time the shaft 194 makes a revolution, the cam 80 causes the feeler members 54 and 56 to oscillate toward each other until one or the other of the contacts 50 or 52 engages the contact 46, thereby energizing a circuit through either solenoid 102 or 104, at a time in the cycle which is a function of the amount part 46 has shifted from its centered position.

This causes the closing of either the contacts 150 or 160, and operation of the motor 26 in a corresponding direction from then until the end of the cycle, and thus for a time interval which is a direct function of the distance part 46 has shifted from normal. Therefore, the extent of movement of valve 10, or the equivalent means being controlled, depends solely on the extent of shifting of part 46, and is entirely independent of variations in voltage or resistance or other factors. It is this method of operation which adapts the regulator so well for remote control operation, as it makes no difference at all in the operation whether leads 28, 30, and 32 are a few feet long or hundreds of yards.

At the same time the circuit through motor 26 is closed, pawl 66 or pawl 68 locks shaft 58 or shaft 60, as the case may be, and the remainder of the cycle is taken up in shifting the equalizer bar 74 angularly on the plunger 76, and consequently rocking the unlocked shaft 60 or 68 past its normal extreme position.

At the end of one revolution of the shaft 194, all the parts are restored to their original positions except that the equalizer bar 74 remains tilted on the plunger 76. Thereafter, as the timing mechanism 162—192 causes periodic operation of the shaft 194 (at intervals timed by the setting of the stop 190), the arms 54 and 56 are oscillated toward and from a center, constantly shifting back toward the original center as the bar 74 is "walked" back to its original position, which center approximately corresponds to the gradually changing position of the control part 46 as this is gradually shifted back to its normal position by the gradual change in the pressure above the diaphragm 18 caused by the changed setting of the valve 10.

During this gradual change, if any further fluctuation requires an additional correction, the time during which the motor 26 operates to make such additional correction depends, not on the normal center toward which the arms 54 and 56 move, but on the displacement of part 46 from an artificial center which has a position determined by a correction for time lag.

While one illustrative embodiment has been described in detail, it is not the intention to limit the scope of the invention to that particular embodiment, or otherwise than by the terms of the appended claims.

What is claimed is:

1. A regulator having movable power-operated feeler members oscillatable about fixed axes and a part shifted according to a condition to be controlled and which is engaged by one or the other of said members when said condition varies one way or the other from a value to be maintained, power means controlled by engagement of one or the other of said members with said part to modify said condition in a sense tending to return it to said value, and means for changing the operation of the feeler members to cause them to move toward and from said part in its position as so shifted and then gradually to return to normal operation as said part returns to normal position as said condition returns to said value.

2. A regulator having movable power-operated feeler members having electrical contacts and a part having a third contact shifted according to a condition to be controlled and which is engaged by one or the other of said members to engage said contacts when said condition varies one way or the other from a value to be maintained, an electrical circuit closed by engagement of said contacts and including an electrically operated device actuated to modify said condition in a sense tending to return it to said value, and means for changing the operation of the feeler members to cause them to move toward and from said part in its position as so shifted and then gradually to return to normal operation as said part returns to normal position as said condition returns to said value.

3. A regulator having control mechanism including a part shifted in accordance with a condition to be controlled, members moved jointly toward and from said part and one or the other of which engages said part when it is shifted to one side or the other of a normal position, means for locking whichever one of said members engages said part, power-operated equalized means for moving said members and which moves the unlocked member past its normal extreme position in an amount corresponding to the amount of movement prevented the locked member, whereby the said members thereafter move toward and from the shifted position of said part, and means for gradually returning said equalized means to normal operation.

4. A regulator having control mechanism including a part shifted in accordance with a condition to be controlled, feeler members pivotally mounted on fixed axes to be moved toward and from said part and one of which engages said part when it is shifted from a normal position, power-operated means for moving said members and which automatically changes the operation of said members upon engagement thereof with said part so that thereafter they move toward and from the shifted position of said part, and means for gradually returning said feeler members to normal operation, together with two circuits having circuit closing means, reversible electrical means for changing said condition which is actuated in one direction or the other upon closing one or the other of said circuits, and operating connections from said feeler members to said circuit closing means.

5. A regulator or the like comprising a reversible motor having a double circuit provided with two pairs of circuit-closing contacts, a part between said pairs and which bridges one pair and closes one part of the circuit when it is moved in one direction, and which bridges the other pair and closes the other part of the circuit when it is moved in another direction, a shaft oscillatable to move said part in either direction, springs arranged to move said shaft in opposite directions and each of which has a latch associated therewith, whereby release of one or the other of said latches causes operation of the motor in a corresponding direction, a circuit breaker affecting both parts of the circuit, and circuit-opening means operating in sequence first to actuate the circuit breaker and then to operate said shaft to open both pairs of contacts and then to re-engage the released latch.

6. A regulator comprising feeler means for ascertaining a condition to be controlled, a part shifted according to the condition to be controlled, said feeler means having members moving toward and from said part, power-operating means having timing mechanism arranged to cause periodic cyclic operation of the feeler means, and electrical means for controlling said condition having a circuit closed by said feeler means after said condition departs from normal and then automatically opened again at a predetermined time in the cycle of operation of the feeler means.

7. A regulator comprising feeler means for ascertaining a condition to be controlled, power-operating means having timing mechanism arranged to cause periodic cyclic operation of the feeler means, and electrical means for controlling said condition having a circuit closed by said feeler means when said condition departs from normal and then automatically opened again at a predetermined time in the cycle of operation of the feeler means, said regulator being so constructed and so arranged that the feeler means closes said circuit at a point in its cycle determined by the extent said condition has departed from normal, whereby said circuit is closed for a time which is a function of the extent of said departure from normal.

8. An electrically operated regulator comprising electrical means for varying a condition to be controlled, and including a control circuit, means for detecting variations in said condition, and means operated periodically in a cycle under the control of the detecting means and which is arranged to close said circuit at a point in said cycle depending on the amount of variation from normal in said condition, and to open said circuit at a predetermined time in the cycle, whereby the electrical means is operated for a length of time which is a function of said variation.

9. An electrically operated regulator comprising electrical means for varying a condition to be controlled and including a control circuit, means for detecting variations in said condition, feeler mechanism operated periodically in a cycle under the control of the detecting means and which is arranged to close said circuit at a point in said cycle depending on the amount of variation from normal in said condition, and means automatically operative thereafter to open said circuit at a predetermined time in the cycle, whereby the electrical means is operated for a length of time which is a function of said variation.

10. An electrically operated regulator comprising electrical means for varying a condition to be controlled and including a control circuit, means for detecting variations in said condition, feeler mechanism operated periodically in a cycle under the control of the detecting means and which is arranged to close said circuit at a point in said cycle depending on the amount of variation from normal in said condition, means automatically operative thereafter to open said circuit at a predetermined time in the cycle, whereby the electrical means is operated for a length of time which is a function of said variation, auxiliary means for shifting said feeler mechanism to a new position when said circuit is closed which depends on said variation, and further auxiliary means for gradually returning said feeler mechanism to normal operation as said condition returns to normal after being varied by the electrical means.

11. A regulator having a feeler means for ascertaining a condition to be controlled, electrical means for controlling said condition having a circuit closed by said feeler means when said condition departs from normal and then automatically opened again at a predetermined time in the cycle of the feeler means whereby said circuit is closed for a time which is a function of the extent of the departure of said controlled condition from normal, and further means whereby the neutral position of feeler means is so shifted that said circuit in future cycles remains closed for a time which is a function of the departure of said controlled condition from the shifted neutral position of said feeler means of which said shifted neutral position is returned to its normal neutral position at a predetermined rate.

12. A regulator comprising feeler means for ascertaining a condition to be controlled, actuating mechanism for controlling said condition and said feeler means so arranged that the time of operation of said actuating mechanism is, in the first cycle of operation after said condition departs from normal, a function of the amount of departure of said condition from normal, and is thereafter a function of the time-rate of return of said condition to its normal.

13. A regulator having a part shifted in accordance with a condition to be controlled, feeler members moved toward and from said part and one of which engages said part when it is shifted from a normal position, means controlled by engagement of said members with said part to modify said condition, and means periodically to move said members comprising a continuously rotated shaft, ratchet mechanism advanced by revolution of said shaft, a driven shaft operably connected to said members to move them, means for tripping said ratchet mechanism when it has been advanced a predetermined amount, and means for coupling said shafts when the ratchet mechanism is tripped to operate the feeler members.

14. A regulator comprising a part shifted in accordance with a condition to be controlled, power operated feeler members moved toward and away from said part, a reversible electric motor, control means for said condition connected to the motor, spaced pairs of contacts connected to the motor, a part movable into engagement with one or the other of said pairs of contacts to energize the motor to run in one direction or the other, an oscillatable shaft carrying said last named part, springs connected to said shaft to move it in opposite directions, latches associated with said springs normally holding the shaft in a neutral position, and means operated by said feeler members when one or the other of them engages said first named part to release one or the other of said latches whereby the associated spring will move the shaft to engage said last named part with one of said pairs of contacts to energize the motor.

KATHERINE E. SMOOT.
*Executrix of the Estate of Charles H. Smoot, Deceased.*